(12) United States Patent
Walrand et al.

(10) Patent No.: US 10,926,336 B2
(45) Date of Patent: Feb. 23, 2021

(54) MACHINE AND METHOD FOR POWDER-BASED ADDITIVE MANUFACTURING

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Gilles Walrand, Clermont-Ferrand (FR); Christian Geay, Clermont-Ferrand (FR); Jean-Baptiste Allard, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 705 days.

(21) Appl. No.: 15/523,491

(22) PCT Filed: Nov. 2, 2015

(86) PCT No.: PCT/EP2015/075414
§ 371 (c)(1),
(2) Date: May 1, 2017

(87) PCT Pub. No.: WO2016/071265
PCT Pub. Date: May 12, 2016

(65) Prior Publication Data
US 2017/0304897 A1    Oct. 26, 2017

(30) Foreign Application Priority Data
Nov. 4, 2014 (FR) .................................... 1460623

(51) Int. Cl.
*B29C 67/00* (2017.01)
*B22F 10/00* (2021.01)
(Continued)

(52) U.S. Cl.
CPC .......... *B22F 10/00* (2021.01); *B23K 26/0604* (2013.01); *B23K 26/342* (2015.10);
(Continued)

(58) Field of Classification Search
CPC ............................... B33Y 10/00; B33Y 30/00
See application file for complete search history.

(56) References Cited

U.S. PATENT DOCUMENTS

| 2013/0112672 A1 | 5/2013 | Keremes et al. ........ 219/121.78 |
| 2013/0270750 A1 | 10/2013 | Green ................. B29C 67/0077 |

(Continued)

FOREIGN PATENT DOCUMENTS

| WO | WO 2013/092757 A1 | 6/2013 |
| WO | WO 2013/178825 A2 | 12/2013 |

OTHER PUBLICATIONS

International Search Report issued by WIPO dated Feb. 1, 2016, in connection with International Application No. PCT/EP2015/075414 (with English translation attached).

*Primary Examiner* — Ryan M Ochylski
(74) *Attorney, Agent, or Firm* — Venable LLP (57) ABSTRACT

A machine for additive manufacturing of components by sintering powder includes a framework, a working zone, at least two beam emission and control modules, and at least two actuators. Each module, which is structured to emit an energy beam and to control the energy beam, is mounted inside the framework and is provided with an emission source and an optical system for focusing the energy beam emitted from the source. Each module acts on the working zone to manufacture a same component. Each optical system is axially movable in translation with respect to the framework. The actuators are associated with the optical systems, respectively, and are arranged to adjust axial positions of the (Continued)

optical systems with respect to the working zone, the axial positions being adjustable independently of each other.

13 Claims, 3 Drawing Sheets (51) Int. Cl.
*B33Y 30/00* (2015.01)
*B29C 64/153* (2017.01)
*B29C 64/25* (2017.01)
*B29C 64/268* (2017.01)
*B23K 26/342* (2014.01)
*B33Y 10/00* (2015.01)
*B23K 26/06* (2014.01)
*B28B 1/00* (2006.01)
*B22F 10/10* (2021.01)

(52) U.S. Cl.
CPC ............ *B28B 1/001* (2013.01); *B29C 64/153* (2017.08); *B29C 64/25* (2017.08); *B29C 64/268* (2017.08); *B33Y 10/00* (2014.12); *B33Y 30/00* (2014.12); *B22F 10/10* (2021.01); *Y02P 10/25* (2015.11)

(56) References Cited

U.S. PATENT DOCUMENTS

2014/0363585 A1 12/2014 Pialot et al. .................. 425/551
2015/0139849 A1 5/2015 Pialot et al. .......... B22F 3/1055

MACHINE AND METHOD FOR POWDER-BASED ADDITIVE MANUFACTURING

FIELD OF THE INVENTION

The present invention relates to a machine and a process for powder-based additive manufacturing by sintering or melting grains of said powder with the aid of an energy beam. An "energy beam" is understood to mean electromagnetic radiation (for example a laser beam) or a beam of particles (for example an electron beam).

RELATED ART

The advantage of manufacturing by selective melting of superposed layers of powder, more commonly known as sintering, mainly resides in the fact that the shape of the components can be modelled by a computer and that the components can then be manufactured on the basis of this modelling by computer control of the energy beam. Moreover, this technique is highly suitable for manufacturing components with small sizes and complex shapes, which are difficult to manufacture with other processes.

When the selective melting is carried out by a laser beam, it is referred to as laser sintering. The laser sintering technique consists in manufacturing the component layer by layer, by stacking the layers of powder, which are consolidated and fused on top of one another by the laser beam, in a stacking direction. The term "powder" is understood to mean a powder or a mixture of powders. The powder may for example be metallic or mineral, for example ceramic.

Conventionally, in order to ensure the preparation of the bed of powder prior to the sintering or melting operation, a layering device is used. Such a device may comprise a cylinder or roller that is able to distribute the powder in a layer on a build platform. For more details, reference may be made for example to the patent applications WO-A1-2013/092757 and WO-A1-2013/178825.

The first layer is deposited and then welded directly to the build platform. The other layers are then formed successively so as to obtain a stack starting from the first layer. In order to selectively realize the melting of the powder, a source which emits an energy beam, the orientation of which is controlled by galvanometric mirrors, and an optical lens for focusing the energy beam on the layers of powder deposited on the build platform are provided.

In order to increase manufacturing productivity, the document WO-A1-2013/178825 recommends providing a machine that comprises two separate build platforms each associated with an emission source of an energy beam and with means for controlling the energy beam that are inherent to each source so as to form a component on each of the platforms. The machine also comprises a layering device common to the two build platforms. Thus the operation of melting the layer of powder deposited in the working zone of one of the platforms can be carried out while a layering operation is taking place in parallel in the working zone of the other platform.

However, this solution does not make it possible to reduce the manufacturing time for each component on the associated build platform.

BRIEF DESCRIPTION OF EMBODIMENTS OF THE INVENTION

The present invention aims to remedy this drawback.

More particularly, the present invention aims to provide a sintering machine that makes it possible to reduce the cycle time necessary for manufacturing each component and to realize particularly precise melting of the layers of powder.

In one embodiment, the machine for the additive manufacturing of components by sintering or melting powder comprises a framework, at least one working zone, and at least two modules for the emission and control of an energy beam that are mounted inside the framework and are each provided with an emission source and an optical focusing means for the energy beam emitted by said source. The emission and control modules each act on said working zone in order to manufacture one and the same component. At least the optical focusing means of each module is axially movable in translation along a vertical axis with respect to the framework. The machine also comprises at least two actuators that are each associated with one of the optical focusing means in order to adjust the vertical axial positions of said means with respect to the working zone independently of one another.

The use of at least two emission and control modules associated with one and the same working zone makes it possible to reduce the manufacturing time for a component. This is because the modules act simultaneously on the working zone for manufacturing said component.

Furthermore, the adjustment of the axial positions of the optical focusing means independently of one another makes it possible to place each of these means at the desired working distance with respect to the working zone. This is because the focusing means, which may for example be lenses, each have a real focal length after manufacturing which differs from their theoretical focal length. It is thus possible to carry out independent adjustment of the working distance or height of each focusing means depending on the real focal length thereof by axially moving these means which are movable independently of one another. It is thus possible to obtain particularly precise melting of the layers of powder deposited successively on the working zone through this independent adjustment of the axial position of the focusing means.

Preferably, the machine comprises a single build platform associated with said working zone.

The emission and control modules may each comprise a casing supporting the emission source and the associated optical focusing means. In one embodiment, the casing of each module is axially movable in translation with respect to the framework under the effect of the associated actuator. In this case, the working distance of each focusing means is adjusted by moving the casing supporting said means.

In one embodiment, each actuator comprises a linearly movable control member, the framework comprising guide means for guiding each of said control members. Preferably, the machine also comprises adjustment means for adjusting the angular orientation of the guide axes of the guide means with respect to said working zone. Thus, it is possible to ensure that the movement of each module in translation along guideways is effected in a predetermined direction. This further increases the precision of melting of the layers of powder.

The framework may comprise at least one frame bounding the working zone and at least one box supporting the emission and control modules, the actuators and the guide means, the adjustment means being interposed between the frame and the box.

Preferably, the machine also comprises adjustment means for adjusting the angular orientation of the optical axis of each focusing means with respect to said working zone.

Thus, it is possible to adjust the orientation of each focusing means such that its optical axis is perfectly perpendicular to the working zone. Such adjustment prior to the melting operations further promotes the obtaining of good melting precision.

In one embodiment, the machine comprises at least two bases that each support one of the emission and control modules and are each connected to the actuator associated with said module, said adjustment means being interposed between each support base and the associated module.

The adjustment means may each comprise a body, a slide mounted in a movable manner inside the body, an adjustment member for adjusting the position of the slide inside the body, and an actuating bushing that is mounted on the body and cooperates with the slide so that, under the effect of a movement of the slide, said bushing moves in translation in a transverse direction with respect to the direction of movement of said slide.

In one embodiment, the machine comprises at least two separate working zones and at least two modules for the emission and control of an energy beam that are inherent to each of the working zones. Preferably, the machine comprises a layering device common to the two working zones.

In one exemplary embodiment, each actuator comprises an electric motor associated with a screw-nut system or an actuating cylinder.

The invention also relates to a process for the additive manufacturing of at least one component by sintering or melting powder, comprising the following steps of:
 a) depositing a layer of powder on at least one working zone,
 b) at least partially melting said layer deposited on said working zone in a pattern corresponding to the section of said component with the aid of at least two energy beams and of at least two separate focusing means that are each associated with one of said beams,
 c) repeating steps a) and b) in order to form the component by stacking layers,
 d) before and/or during the melting operations, adjusting the vertical axial positions of each focusing means with respect to the working zone independently of one another in order to alter the size of each energy beam projected onto said working zone.

In a preferred embodiment, the angular orientations of each focusing means with respect to the working zone are adjusted independently of one another before the melting operations.

BRIEF DESCRIPTION OF THE DRAWINGS

The present invention will be understood better from reading the detailed description of embodiments which are given by way of entirely non-limiting example and are illustrated by the appended drawings, in which.

DETAILED DESCRIPTION OF EMBODIMENTS OF THE INVENTION

Figure 1:
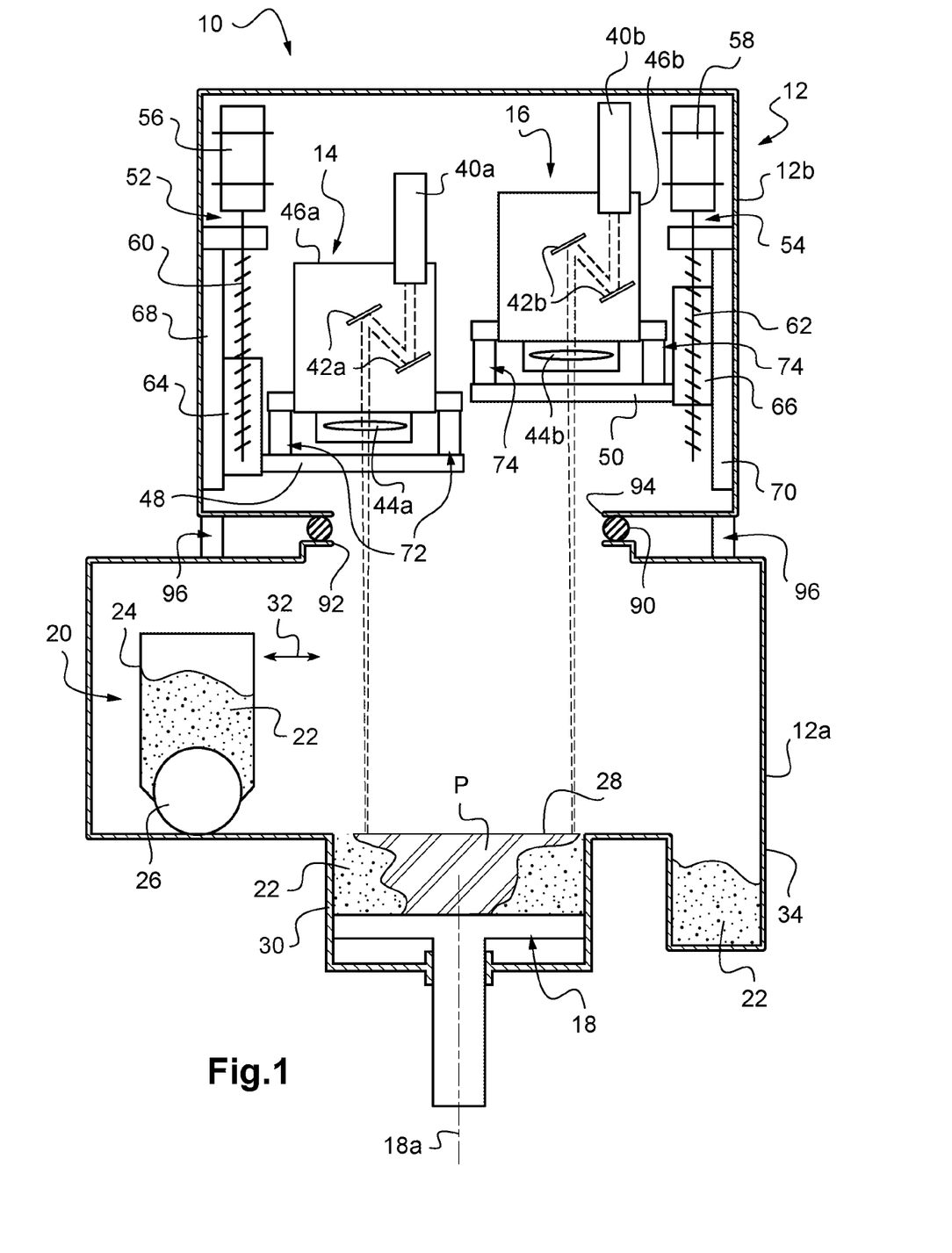
FIG. 1 is a schematic cross-sectional view of a machine according to a first exemplary embodiment.

FIG. 1 shows an exemplary embodiment of a machine, bearing the overall reference 10, that is provided for the additive manufacturing of at least one component P and is shown in a position in which it is assumed to be vertical. The expression "at least one component P" is understood to mean a single component P or a set of several components P produced simultaneously.

The machine 10 comprises a framework 12, two separate modules 14, 16 for the emission and control of an energy beam, a working platform 18 common to the two modules and a layering device 20 for applying powder 22 to the working platform. In the figure, the two separate energy beams emitted are shown by dashed lines. As will be described in more detail below, the working distances between each module 14, 16 and the associated platform 18 are adjusted independently of one another.

In the exemplary embodiment illustrated, the layering device 20 comprises a hopper 24 for storing and feeding powder 22 that is positioned above the working platform 18, and a rotary roller 26 for metering the powder onto a flat working zone 28 bounded by the framework 12. The roller 26 extends through a lower opening in the hopper 24 and controls the quantity of powder transferred by gravity. The roller 26 can for example comprise a plurality of grooves that are made in its outer surface and have the function of transferring a reproducible metered quantity of powder onto the working zone 28. The layering device 20 may also comprise, in combination with or as a replacement for the roller, some other distribution means, for example a scraper. For more details on the design of such a layering device, reference may be made for example to the patent applications WO-A1-2013/092757 and WO-A1-2013/178825.

The working zone 28 is bounded by a sleeve 30 of the framework, inside which the working platform 18 is mounted so as to slide along a vertical axis 18a. The sleeve 30 has a cross section with the same shape as that of the platform 18, for example circular, square, rectangular, etc. The sleeve 30 is situated opposite the zone of action of the modules 14, 16, which both act on the working zone 28. The sleeve 30 is secured to the framework 12 by being attached and fixed to said framework or by being produced in one piece with the latter.

The layering device 20 is able to move in translation inside the framework 12 in a horizontal direction of movement illustrated schematically by the arrow bearing the reference 32, so as to be able to deliver the predetermined quantity of powder on each pass over the working zone 28. Once the device 20 has crossed the working zone 28, the excess powder is pushed into a collection vessel 34 of the framework 12 of the machine. The vessel 34 is adjacent to the sleeve 30.

The separate modules 14, 16 are disposed side-by-side inside the framework 12 and are intended to act on the working zone 28 which is common to these two modules. Since the modules 14, 16 are identical in the exemplary embodiment illustrated, only the components of the module 14 will be described here using the reference "a", it being understood that the identical components of the other module 16 bear the reference "b" in FIG. 1.

The module 14 comprises an emission source 40a for an energy beam, for example of the laser type, two galvanometric mirrors 42a that are able to control the orientation of the emitted beam, and a lens 44a for focusing said beam onto the working zone 28 in order to be able to heat each layer of powder deposited in a pattern corresponding to the section of the component P to be manufactured and thus to selectively realize the melting of the powder.

The module 14 also comprises a casing 46a on which the source 40a, the mirrors 42a and the lens 44a are mounted. The casing 46a is supported by a base 48 of the framework.

The support base 48 is situated vertically above the working zone 28. In an identical manner, the casing 46b of the module 16 is likewise supported by a base 50 of the framework which is adjacent to the base 48. The support bases 48, 50 of the modules each comprise an opening (not shown) to allow the passage of energy beams that are emitted by the sources 40a, 40b and focused by the lenses 44a, 44b.

The machine 10 also comprises two separate actuators 52, 54 each associated with one of the modules 14, 16 so as to be able to modify the axial positions of the modules independently of one another. Each module 14, 16 is axially movable in translation along a vertical axis with respect to the framework 12. The actuators 52, 54 are fastened to the framework 12 and mounted inside the latter. The actuators 52, 54 are connected to the support bases 48, 50, respectively, so as to allow the movement of the modules 14, 16.

In the exemplary embodiment illustrated, each actuator 52, 54 comprises an electric motor 56, 58 fastened to the framework 12 and a screw-nut system, the screw 60, 62 of which is driven in rotation by the motor and the nut 64, 66 of which is guided in translation by a guideway 68, 70 of the framework, with a vertical guide axis. The guide axes of the guideways 68, 70 are substantially parallel to one another. The nut 64, 66 is fastened to the support base 48, 50 so as to allow the axial movement of the associated module 14, 16. The nut 64, 66 forms a control member, acting in a vertical linear manner, for the associated module 14, 16.

The screw-nut system can be of the ball type, the roller type or involve direct engagement between the screw and the nut. The use of a screw-nut system makes it possible to control the axial position of each module 14, 16 with respect to the framework 12 in an extremely precise manner. Alternatively, it is possible, however, to provide other types of actuator, for example electric, hydraulic or pneumatic actuating cylinders.

The machine 10 also comprises a pair of adjustment means 72, 74 associated with each module 14, 16 so as to be able to adjust the angular orientation of the optical axis of the lens 44a, 44b of the module in question with respect to the working zone 28. Each pair of adjustment means 72,74 is interposed between the support base 48, 50 and the associated casing 46a, 46b of the module. As will be described in more detail below, the angular orientation of the optical axis of each lens 44a, 44b is adjusted by angular orientation of the associated module 14, 16. The adjustment means 72, 74 of one and the same pair are disposed on either side of the lens 44a, 44b of the associated module. A ball joint connection is also provided between the support base 48, 50 and the associated casing 46a, 46b. The adjustment means 72, 74 are identical to one another.

Figure 2:
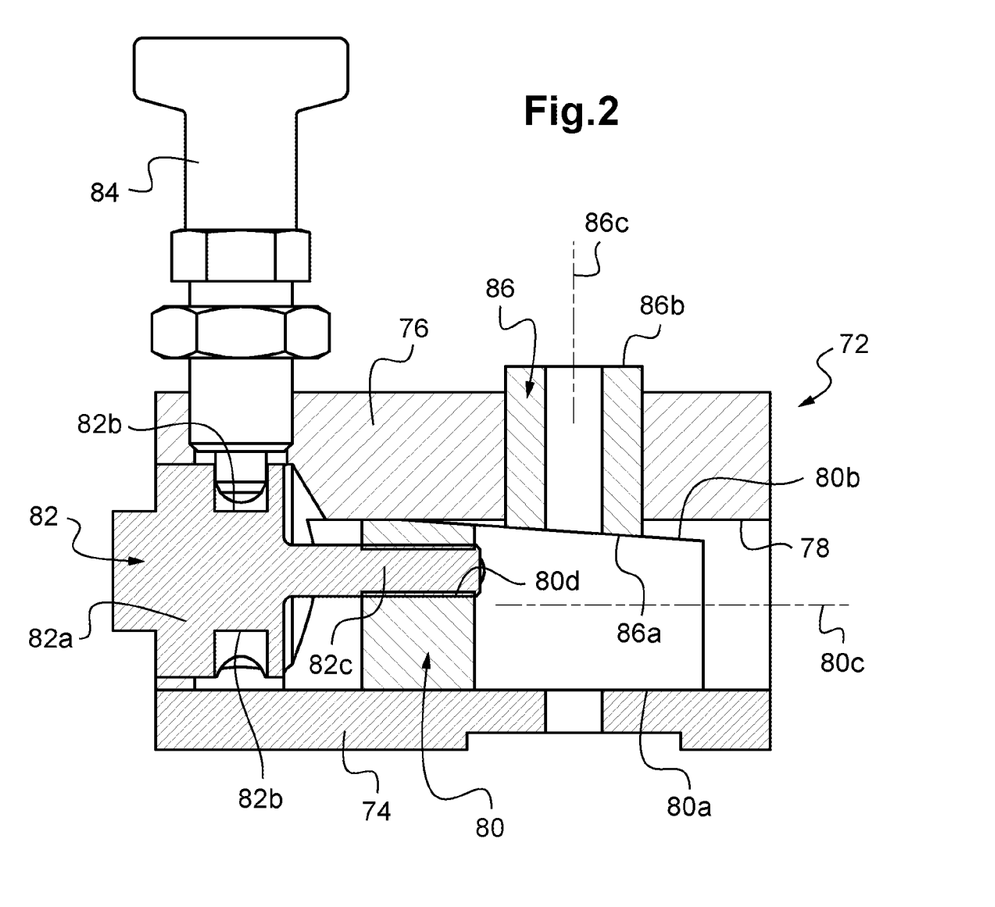
FIG. 2 is a cross-sectional view of an adjustment means of the machine from FIG. 1.

As illustrated in FIG. 2, the adjustment means 72 comprises a base plate 74 that is fastened to the support base of the associated module, and a body 76 fastened to the plate, bounding a housing 78 therebetween, inside which a slide 80 is mounted. The slide 80 comprises a flat lower face 80a that bears against the plate 74 and a frustoconical upper face 80b forming a slope.

The adjustment means 72 also comprises an adjusting screw 82 mounted in a rotatable manner inside the housing 78 of the body so as to allow the slide 80 to move in translation along a horizontal axis 80c, and a locking tie bar 84 mounted in said body in order to prevent the screw 82 from rotating. The screw 82 comprises a cylindrical portion 82a partially mounted inside the body 76 and a plurality of cutouts 82b that are formed on the outer surface of the cylindrical portion and are intended to receive a lower end of the tie bar 84 so as to prevent the rotation of the screw. The screw 82 also comprises a threaded rod 82c that extends the cylindrical portion 82a and is mounted inside a corresponding threaded bore 80d in the slide. The tie bar 84 is movable with respect to the body 76 between a locking position illustrated in FIG. 2, in which its lower end is accommodated inside one of the cutouts 82b, and an unlocking position in which said end is situated away from the cylindrical portion 82a such that the screw 82 can be rotated manually. A return spring (not shown) keeps the tie bar 84 in the locking position and returns it automatically into this position after the screw 82 has been rotated by an operator.

The adjustment means 72 also comprises an actuating bushing 86 that is mounted on the body 76 and comprises a lower face 86a that bears against the upper face 80b of the slide and matches the shape of said upper face. The bushing 86 comprises an upper face 86b intended to bear against the lower face of the casing of the associated module. The bushing 86 is movable in translation with respect to the body 76 along an axis 86c perpendicular to the axis 80c of the slide under the effect of a movement of said slide that is controlled by a rotation of the screw 82.

Referring again to FIG. 1, the framework 12 comprises a lower fixed frame 12a and an upper box 12b mounted on the frame. The frame 12a bounds the working zone 28 and comprises the collecting vessel 34. The layering device 20 is mounted inside the frame 12a. The box 12b supports the modules 14, 16, the support bases 48, 50 and the actuators 52, 54 and associated guideways 68, 70. These means are mounted inside the box 12b. An annular sealing member 90, such as a gasket, is mounted axially between the frame 12a and the box 12b. The frame 12a and the box 12b each comprise an opening 92, 94 for the passage of energy beams that are emitted by the sources 40a, 40b and focused by the lenses 44a, 44b. The openings 92, 94 are vertically aligned.

The machine 10 also comprises two adjustment means 96 that are intended to allow the angular orientation of the guide axes of the guideways 68, 70 with respect to the working zone 28. The adjustment means 96 are interposed between the frame 12a and the box 12b so as to be able to adjust these axes by angular orientation of the box 12b supporting the guideways 68, 70. The adjustment means 96 are disposed between an upper face of the frame 12a and a lower face of the box 12b and are disposed on either side of the openings 92, 94. A ball joint connection is also provided between the upper face of the frame 12a and the lower face of the box 12b. Each adjustment means 96 has a structure identical to that of the adjustment means 72, 74 described above. The upper face of the actuating bushing of each adjustment means 96 bears against the lower face of the box 12b.

Before starting to manufacture the components, two steps of manual adjustment of the machine 10 are carried out as follows. In a first step, the angular orientation of the box 12b with respect to the fixed frame 12a is adjusted manually. During this step, the adjusting screws of the adjustment means 96 are actuated in order to vertically move the actuating bushings and to pivot the box 12b about a vertical axis with respect to the frame 12a. This adjustment is carried out so as to orient the guide axes of the guideways 68, 70 perpendicularly to the working zone 28.

In a second manual adjustment step, the angular orientation of the optical axis of each lens 44a, 44b with respect to the working zone 28 is adjusted. To this end, the adjusting screws of the adjustment means 72, 74 are actuated in order to vertically move the actuating bushings and to pivot each module 14, 16 about a vertical axis with respect to the support base 48 and to the frame 12a. This step makes it possible to manually adjust the orientation of the optical axis of each lens 44*a*, 44*b* such that it is parallel to the axis of the associated guideway 68, 70. Following this adjustment, the optical axis of each lens 44*a*, 44*b* extends parallel to the axis 18*a* of translation of the working platform and perpendicularly to the working zone 28.

Following these manual adjustment steps, which are provided to fine-tune the machine 10, the components can be manufactured.

While the components are being produced, the layering device 20 is first of all made to deposit a first layer of powder on the working zone 28 of the build platform. Following deposition, the first layer of powder extends substantially horizontally. The powder may for example be metallic or mineral, for example ceramic. Preferably, the powder is metallic.

Next, the actuators 52, 54 are made to independently regulate the axial position of each lens 44*a*, 44*b* of the modules with respect to the working zone 28. The vertical movements in translation of the modules 14, 16 inside the framework 12 are controlled by the actuators 52, 54 independently of one another.

Thus, it is possible to adjust the axial distance between each lens 44*a*, 44*b* and the working zone 28 along the real focal length which is inherent to the optical chain of the associated module 14, 16, said optical chain being made up of the emission source 40*a*, 40*b*, the mirrors 42*a*, 42*b* and said lens. For example, the real focal length of each lens is generally different from the theoretical focal length on account of manufacturing imprecisions. It is thus possible to carry out independent adjustment of the working distance of each lens depending on the real focal length such that the rays of the energy beam emitted by each source 40*a*, 40*b* converge on the working zone 28. The vertical positions of each lens 44*a*, 44*b*, and more generally of each module 14, 16, are thus adjusted independently of one another depending on the real focal length of said lens, and more generally depending on the focal length of the associated optical chain. This thus encourages the obtaining of good melting precision of the layer of powder deposited on the working zone 28 by each module 14, 16. This adjustment of the focusing of the optical chain of each module 14, 16 that is carried out while the components are being manufactured is all the more efficient, the more precise the steps of adjustment of the orientation of the optical axis of each lens 44*a*, 44*b* that are carried out before this manufacturing operation are.

Next, during a subsequent step, each source 40*a*, 40*b* is made to emit an energy beam, the orientation of which is controlled by the associated mirrors 42*a*, 42*b* and which passes through the associated lens 44*a*, 44*b*. Each lens 44*a*, 44*b* focuses the associated energy beam depending on the adjustment carried out beforehand that is inherent thereto in order to heat the layer of powder in a pattern corresponding to the section of the component P to be manufactured, and thus to selectively melt the powder. With the two modules 14, 16 acting on one and the same working zone 28 in order to manufacture one and the same component P, the cycle time for manufacturing the component is reduced.

After the step of treating the first deposited layer of powder with energy beams, the working platform 28 is lowered by the thickness of this layer and a new layer of powder is deposited by the layering device 20 so as to cover the first layer of powder which is partly melted. By way of indication, the thickness of a layer of powder may vary from a few micrometres, for example 10 μm, to several hundred micrometres, for example 500 μm. The working zone 28 may for example have a length of 500 mm.

Next, the independent adjustment of the axial position of each lens 44*a*, 44*b* of the modules may be carried out again if need be by the actuators 52, 54 so as to obtain good melting precision of the second layer. The selective melting of the second layer is carried out as before. These steps are repeated again in order to form the component P by stacking of melted layers.

At the start of manufacturing of the component P, the working zone 28 is formed by the upper surface of the working platform 18. During manufacturing, the working zone 28 is formed by the upper surface of the final layer deposited and supported by the platform 18. At the start of and during manufacturing, the working zone 28 is bounded radially by the sleeve 30. When the manufacturing of the component P is complete, that is to say when all of the layers of powder necessary for building it have been successively deposited and then melted, the component is removed from the build platform 18.

In the exemplary embodiment described, the independent adjustment of the spacing between each lens 44*a*, 44*b* of the modules and the working zone 28 is carried out prior to the selective melting operations of the deposited layers of powder. Such adjustment can also be carried out during the melting operations. Thus, different adjustment of the working distance depending on the region of the deposited layer of powder to be melted can be provided for each module 14, 16. This makes it possible to retain precise focusing of the beams emitted in the various zones of the layer of powder to be melted. By way of indication, a first adjustment for the contours of the component P to be manufactured and a second, different adjustment for the central zone of the component can be provided for example for each module 14, 16, such that there are two different focuses depending on the zones of the layers of powder to be melted.

In another exemplary embodiment of the additive manufacturing process, it is also possible to provide, in a controlled manner, defocusing of each energy beam on a part of the working zone 28, so as to obtain an impact in the form of a circle and not of a point. It is thus possible to locally melt a zone of the layer of powder deposited over a larger area, if need be. This makes it possible to reduce the cycle time for manufacturing the component.

Figure 3:
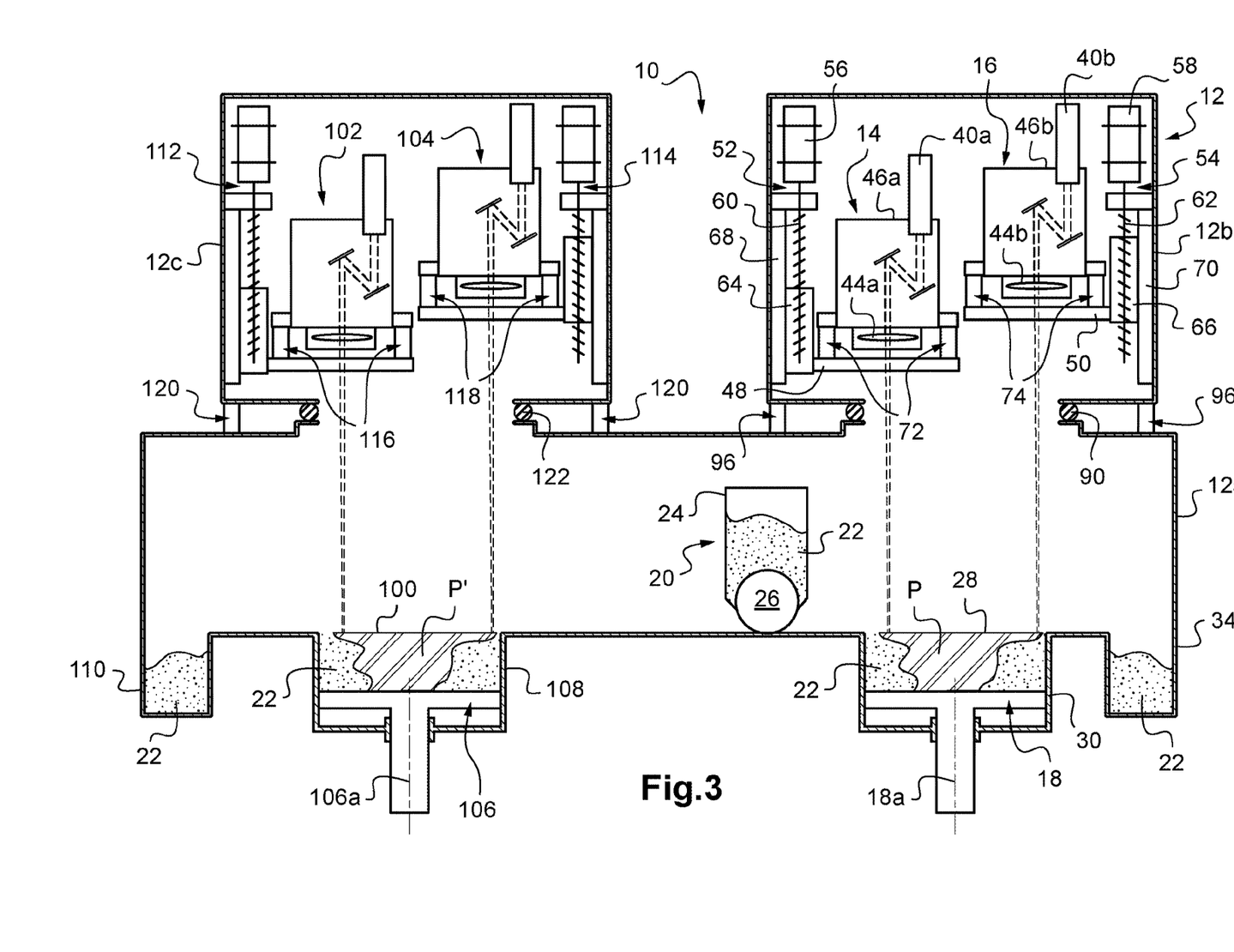
FIG. 3 is a schematic cross-sectional view of a machine according to a second exemplary embodiment.

The exemplary embodiment illustrated in FIG. 3, in which identical elements bear the same reference signs, differs from the first example in that the machine 10 comprises an additional working zone 100 different from the working zone 28, and two modules 102, 104 for the emission and control of an energy beam that are associated with this working zone 100. In this exemplary embodiment, the framework 12 comprises a second upper box 12*c* which is mounted on the frame 12*a* and inside which the separate modules 102, 104 are disposed. The frame 12*a* in this case has a greater width for mounting the box 12*c*.

The machine 10 also comprises a working platform 106 which is associated with the working zone 100 and which is common to the two modules 102, 104. The platform 106 is mounted so as to slide along a vertical axis 106*a* inside a sleeve 108 of the frame 12*a* of the framework. A collecting vessel 110 for the powder is provided on top of the frame 12*a*, adjacent to the sleeve 108. The modules 102, 104 are provided to act on the working zone 100 and to manufacture a second component P' formed on the working platform 106. The modules 102, 104 are identical to the modules 14, 16 associated with the first working zone 28. In this exemplary embodiment, the layering device 20 for the powder 22 is common to the two working zones 28, 100, in a manner analogous to the patent application WO-A1-2013/178825.

The machine 10 comprises two separate actuators 112, 114 each associated with one of the modules 102, 104 so as to be able to modify the axial positions of the modules with respect to the framework 12 independently of one another. The modules 102, 104 associated with the working zone 100 are movable independently of the modules 14, 16 associated with the working zone 28. The design, the mounting of the actuators 112, 114 and the cooperation thereof with the modules 102, 104 and the box 12c are identical to those described above for the actuators 52, 54 of the modules 14, 16.

The machine 10 also comprises a pair of adjustment means 116, 118 associated with each module 102, 104 so as to be able to adjust the angular orientation of the optical axis of the lens of the module in question with respect to the working zone 100. The machine 10 also comprises two adjustment means 120 that are intended to allow the angular orientation of the guide axes of the guideways that cooperate with the actuators 112, 114 with respect to the working zone 100. The design and the disposition of the adjustment means 116 to 120 are identical to those of the adjustment means 72, 74 and 96. An annular sealing member 122, such as a gasket, is mounted axially between the frame 12a and the box 12c.

In the exemplary embodiments described, each module for the emission and control of an energy beam is able to move in translation in its entirety with respect to the framework. In a variant, it may be possible to provide a design of each module such that only the focusing lens of said module is able to move in translation with respect to the framework.

The invention provides a machine comprising at least two modules for the emission and control of an energy beam that act on a common working zone and each comprise an optical focusing means for the associated beam, the working distance of which can be adjusted independently of the working distance of the one or more other optical focusing means in order to optimize the melting parameters.

The invention claimed is:

1. A machine for additive manufacturing of components by sintering or melting powder, the machine comprising:
a framework;
a working zone;
a build platform associated with the working zone mounted so as to slide along a vertical axis with respect to the framework;
beam emission and control modules mounted inside the framework, each of the modules being structured to emit an energy beam and to control the energy beam, each of the modules including:
an emission source structured to emit the energy beam, and
an optical focusing system structured to focus the energy beam emitted by the emission source;
actuators, each of the actuators being associated with one of the beam emission and control modules, each of the actuators being structured to adjust a vertical axial position of the optical focusing system of the corresponding module with respect to the working zone, the vertical axial positions of the optical focusing system being adjusted by the actuators independently of one another,
adjustment devices, each of the adjustment devices being associated with one of the beam emission and control modules, each of the adjustment devices being structured to adjust an angular orientation of an optical axis of the optical focusing system of the corresponding module with respect to the working zone such that the optical axis extends parallel to the vertical axis of translation of the build platform,
wherein each of the modules acts on the working zone in order to manufacture a same component, and
wherein each of the optical focusing systems is structured to move axially in translation along the vertical axis of translation with respect to the framework and the build platform.

2. The machine according to claim 1, wherein each of the modules includes a casing structured to support the emission source and the optical focusing system corresponding to the module.

3. The machine according to claim 2, wherein each of the casings is axially movable in translation with respect to the framework via action of a corresponding one of the actuators.

4. The machine according to claim 1, wherein
each of the actuators includes a linearly movable control member, and
the framework includes a guide portion structured to guide each of the control members.

5. The machine according to claim 4, further comprising an adjustor structured to adjust an angular orientation of guide axes of the guide portion with respect to the working zone.

6. The machine according to claim 5,
wherein the framework includes:
a frame bounding the working zone, and
a box supporting the modules, the actuators, and the guide portion, and
wherein the adjustor is interposed between the frame and the box.

7. The machine according to claim 5, wherein each of the adjustment devices includes:
a body,
a slide movably mounted in the body,
an adjustment member structured to adjust a position of the slide in the body, and
an actuating bushing mounted on the body and structured to cooperate with the slide so that, under an effect of a movement of the slide, the bushing moves in translation in a transverse direction with respect to a direction of movement of the slide.

8. The machine according to claim 1, further comprising support bases structured to support the modules,
wherein each of the support bases supports a corresponding one of the modules and is connected to the actuator associated with the corresponding one of the modules, and
wherein each of the adjustment devices is interposed between a corresponding one of the support bases and the module associated with the corresponding one of the support bases.

9. The machine according to claim 1, further comprising:
a second working zone separate from the working zone; and
second beam emission and control modules separate from the modules, the second modules being structured to emit a second energy beam and to control the second energy beam with respect to the second working zone.

10. The machine according to claim 9, further comprising a layering device common to the working zone and the second working zone.

11. The machine according to claim 1, wherein each of the actuators includes an electric motor associated with a screw-nut system or an actuating cylinder.

12. A process using the machine of claim 1 for additive manufacturing components by sintering or melting powder, the process comprising steps of:
- depositing a layer of powder on the working zone;
- melting, at least partially, the layer deposited on the working zone in a pattern corresponding to a section of the component using at least two beam emission and control modules, each comprising the emission source, to emit the energy beam and the optical focusing system, each optical focusing system being associated with a respective one of the energy beams;
- repeating the depositing step and the melting step to produce stacked layers, the component being formed from the stacked layers;
- at least one of before and during the melting step, adjusting the vertical axial positions of the optical focusing systems with respect to the working zone, the axial vertical positions being adjusted independently of one another in order to alter a size of each energy beam projected onto the working zone.

13. The process according to claim 12, wherein, in the adjusting step, angular orientations of the focusing systems are adjusted with respect to the working zone, the angular orientations being adjusted independently of one another before the melting step.

\* \* \* \* \*